US011877114B1

(12) United States Patent
Johnson

(10) Patent No.: US 11,877,114 B1
(45) Date of Patent: Jan. 16, 2024

(54) ASSEMBLY REMOVABLY SECURED TO HEADWEAR FOR POSITIONING ONE OR MORE SPEAKERS AT OR ADJACENT TO AN EAR OF THE PERSON WEARING THE HEADWEAR

(71) Applicant: Ben Edward Johnson, Deerfield Beach, FL (US)

(72) Inventor: Ben Edward Johnson, Deerfield Beach, FL (US)

( * ) Notice: Subject to any disclaimer, the term of this patent is extended or adjusted under 35 U.S.C. 154(b) by 10 days.

(21) Appl. No.: 17/735,312

(22) Filed: May 3, 2022

Related U.S. Application Data

(60) Provisional application No. 63/183,877, filed on May 4, 2021.

(51) Int. Cl.
*H04R 25/00* (2006.01)
*H04R 1/10* (2006.01)

(52) U.S. Cl.
CPC ........... *H04R 1/105* (2013.01); *H04R 1/1066* (2013.01); *H04R 2201/109* (2013.01)

(58) Field of Classification Search
CPC .. H04R 1/1041; H04R 1/105; H04R 2460/13; H04R 1/026; H04R 1/1091
See application file for complete search history.

(56) References Cited

U.S. PATENT DOCUMENTS 4,499,593 A * 2/1985 Antle .................. H04R 1/1066 381/378
5,046,192 A * 9/1991 Ryder .................. H04R 5/0335 2/209

* cited by examiner

*Primary Examiner* — Amir H Etesam
(74) *Attorney, Agent, or Firm* — DANIEL S. POLLEY, P.A.

(57) ABSTRACT

A speaker securement assembly for headwear comprising a body member, a first speaker arm and a second speaker arm. One end of each of the speaker arms are inserted within the body member. The position of the speaker arms can be adjustable with respect to the body member. The non-insertion ends of the first and second speaker arms can be provided with speaker connectors, which in one embodiment can be an opening, for snugly received an associated Speaker. Preferably, two Clasps can be provided at or near the outer ends of the body member for removably securing the body member to the headwear to be worn by the user. With the body member secured to the headwear and the headwear worn by the user, the Speakers received within connectors at the ends of the speaker arm can be positioned at or near to the wearer's ears.

16 Claims, 5 Drawing Sheets

ASSEMBLY REMOVABLY SECURED TO HEADWEAR FOR POSITIONING ONE OR MORE SPEAKERS AT OR ADJACENT TO AN EAR OF THE PERSON WEARING THE HEADWEAR

This application claims the benefit of and priority to U.S. Provisional Patent Application Ser. No. 63/183,877, filed May 4, 2021, which application is incorporated by reference in its entirety for all purposes.

FIELD OF THE DISCLOSURE

The disclosure relates generally to electronic accessories and more particularly to a novel speaker holding assembly that is removably secured to headwear while the headwear is worn by a user.

BACKGROUND

Often when wearing earbuds or air pods to listen to music, audiobooks, etc. the inserted earbuds or pods fall out of the ear. Where the user is in transit and moving and unaware of the exact instance that the earbud or air pod fell out of his or her ear, by the time the user notices that the earbud(s) or air pod(s) is missing, it may be too late to find the earbud(s) or pod(s) on the ground. The novel device described herein overcomes the above problems with using earbuds and air pods, as well as other speakers.

SUMMARY OF THE DISCLOSURE

A novel speaker securement assembly for headwear is generally disclosed and can comprise a body or manifold member, a first speaker arm and a second speaker arm. The body can preferably have a center body portion, a left body portion and a right body portion and can be preferably constructed from a flexible material. The first speaker arm can be adjustable with respect to the body member and preferably removably secured to the left body portion and the second speaker arm can be adjustable with respect to the body member and preferably removably secured to the right body portion 50.

In one non-limiting embodiment, the first speaker arm can be provided with an elongated insertion member preferably provided with a plurality of side ridges that can be used to position the first speaker arm at an open outer end of the left body portion. Similarly, the second speaker arm can be provided with an elongated insertion member preferably provided with a plurality of side ridges that can be used to position the second speaker arm at an open outer end of the right body portion.

A first internal receiving area can be provided within the left body portion for receiving the first speaker arm. An internal wall of the first internal receiving area can be smooth or can be similarly shaped (i.e. ridged) to correspond to the shape of the insertion member of the first speaker arm. Similarly, a second internal receiving area can be provided within the right body portion for receiving the second speaker arm. The second internal receiving area can also have a smooth or ridged internal wall, similar to the first internal receiving area.

Preferably, the non-insertion ends of the first and second speaker arms can be provided with speaker/pods/earbuds, etc. (collectively "Speaker") connectors which in one non-limiting preferred embodiment can be an opening, for which a portion of the associated Speaker can be snugly inserted through and secured by a snug fit.

A clasp, clip or clamp member (collectively "Clasp") can be preferably provided at or near the open outer ends of the left body portion and the right body portion (though other locations on the body member can also be used and are considered within the scope of the disclosure) for removably securing the body member to the headwear to be worn by the user, which in a preferred embodiment can be a hat or cap having a bill or brim. Preferably a portion of a side of bill or brim can be received by a Clasp on each side of bill or brim.

Preferably, with the body member removably secured to the headwear by the Clasp or other securement member, the visible length (i.e. portion not within the left and right side body portions) of the first and second speaker arms can be adjusted to position the Speakers near, at, adjacent to, close by, the ears of the user, or at any other desired location by the user.

A flange member can extend downward (preferably at an angle) with respect to the center body portion to provide for a further contact point for the body member with the headwear.

Though preferably the Speakers can be wireless, the novel disclosed speaker securement assembly can also be used with wired Speakers.

DETAILED DESCRIPTION

Figure 1:
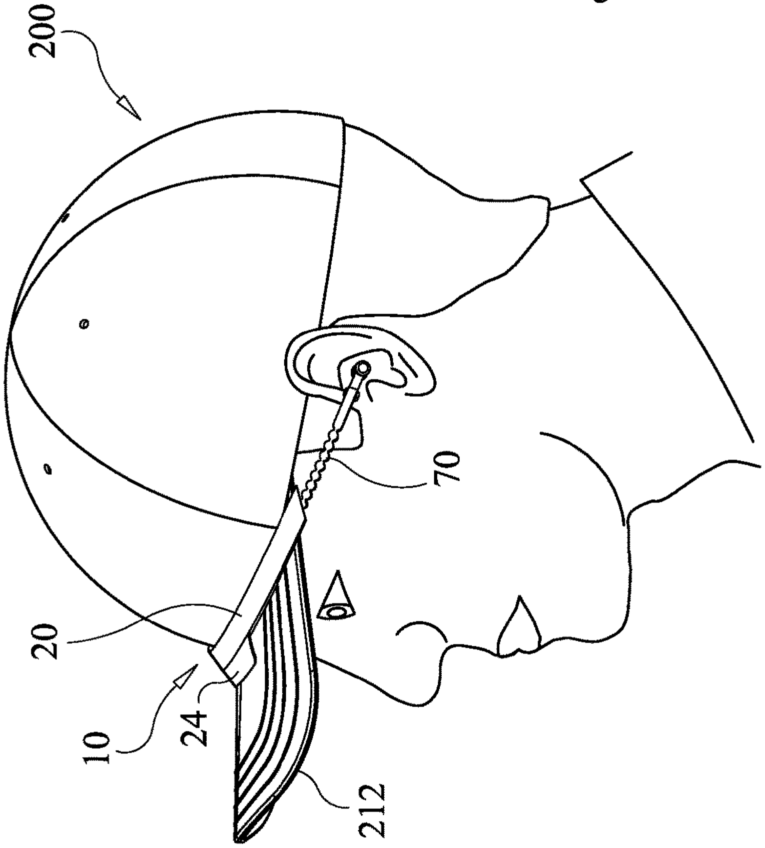
FIG. 1 is a side view showing a user/wearer wearing a hat/cap headwear in a traditional position and showing a first non-limiting speaker position with respect to the user/wearer's ear using the novel speaker holding/securement assembly in accordance with the present disclosure.
Figure 2:
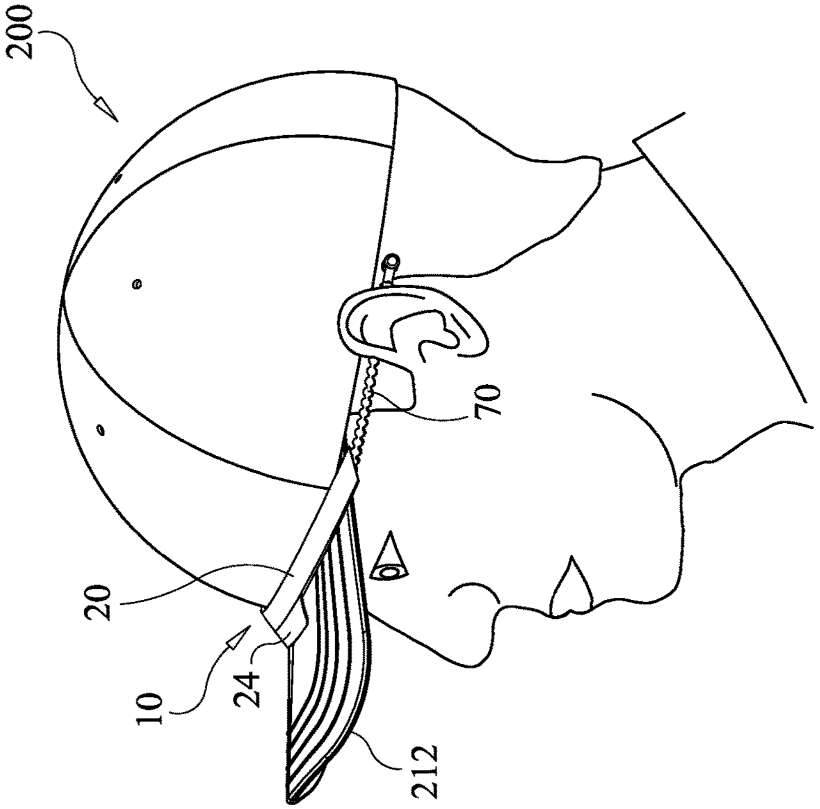
FIG. 2 is a showing a second non-limiting speaker position with respect to the user/wearer's ear in a headwear traditional position.
Figure 4:
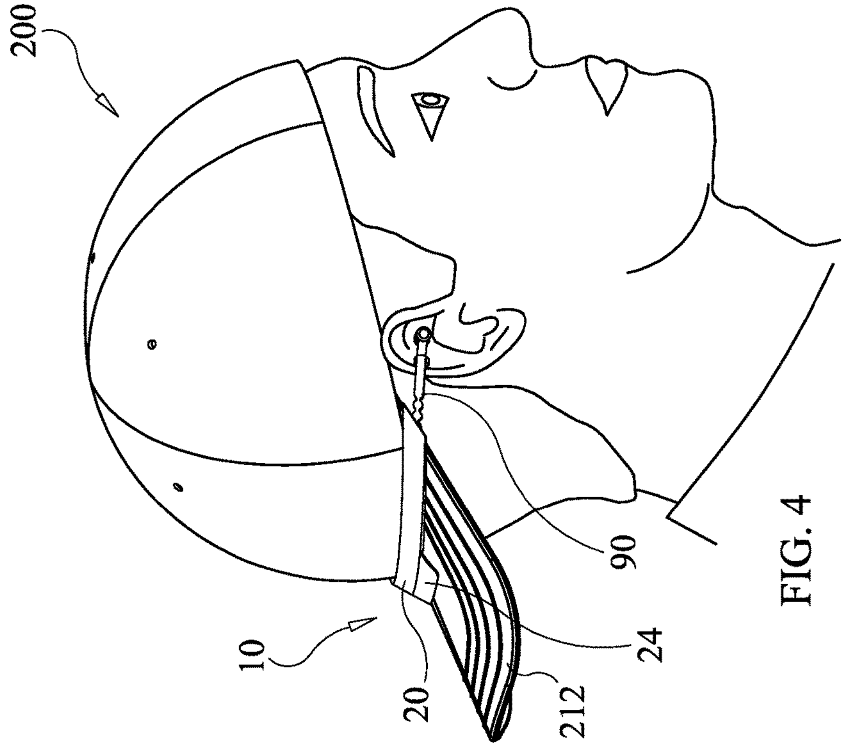
FIG. 4 is a showing a second non-limiting speaker position with respect to the user/wearer's ear in a headwear reverse position.
Figure 3:
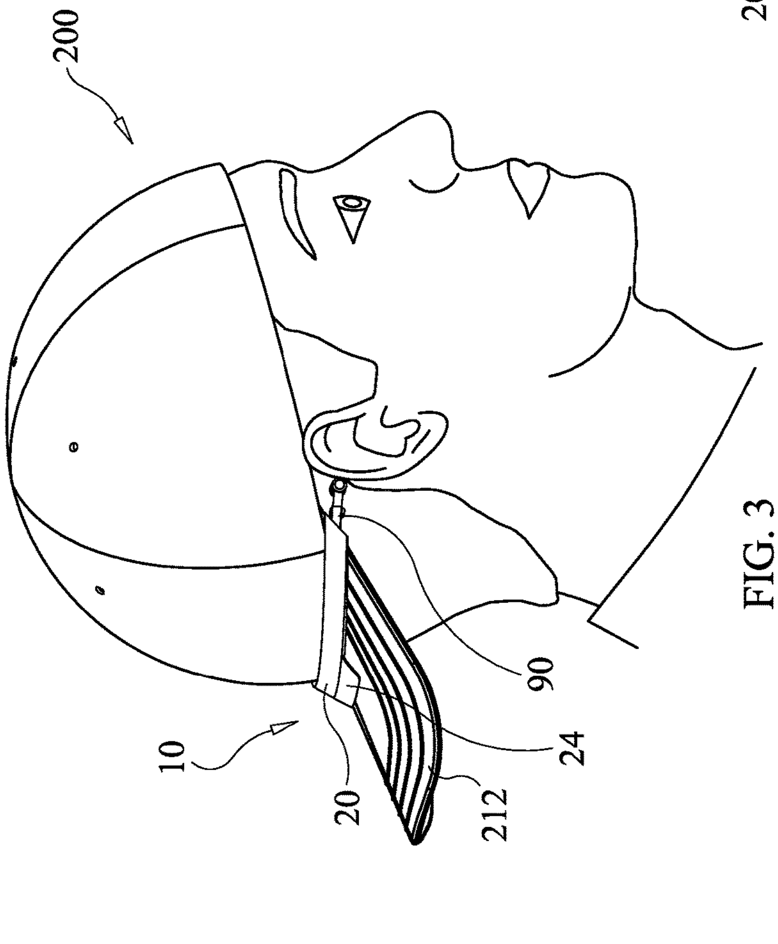
FIG. 3 is a side view showing a user/wearer wearing a hat/cap headwear in a reverse position and showing a first non-limiting speaker position with respect to the user/wearer's ear using the novel speaker holding/securement assembly in accordance with the present disclosure.

As seen in the drawings, a Speaker (as defined below) securement assembly for headwear is shown and described below and generally designated as securement assembly 10. Securement assembly 10 can generally comprise a body or manifold member 20, a first speaker arm 70 and a second speaker arm 90. Body 20 can preferably have a center body portion 22, a left body portion 30 and a right body portion 50. Though not limiting, preferably center body portion 22, left body portion 30 and right body portion 50 can be constructed integrally or monolithically formed as a one piece body 20, that is preferably constructed from a flexible material, to give some flexibility to body 20 to allow it be substantially flush (secured in a arced/circular configuration when in use, etc.) to a portion of the headwear 200 that it is secured to (See FIG. 1. FIG. 2, FIG. 3 and FIG. 4). Left body portion 30 can preferably have an open outer end 32 and right body portion 50 can preferably have an open outer end 52. First speaker arm 70 can be adjustable and preferably removably secured to left body portion 30 and second speaker arm 90 can be adjustable and preferably removably secured to right body portion 50 (though it is also within the scope of the disclosure to use the device secured to a headwear (i.e. hat, cap, etc.) with just one speaker arm 70 or 90 being provided.

Speaker arm 70 can be provided with an elongated insertion member 72 preferably provided with a plurality of side ridges 74 (defining a plurality of peaks 76 and valleys 78) that are used to position speaker arm 70 at open outer end 32 of left body portion 30. Similarly, speaker arm 90 can be provided with an elongated insertion member 92 preferably provided with a plurality of side ridges 94 (defining a plurality of peaks 96 and valleys 98) that are used to position speaker arm 90 at open outer end 52 of right body portion 50. It is also within the scope of the disclosure to adjustably and removably secure speaker arm 90 at open outer end 32 and adjustably and removably secure speaker arm 70 at open outer end 52.

A first internal receiving area 36 can be provided and preferably begins at open outer end 32 and within a preferred majority of the internal length of left body portion 30 for receiving first speaker arm 70 or second speaker arm 90 once the speaker arm has been inserted through the opening at open outer end 32. The internal wall of internal receiving area 36 can be smooth or can be similarly shaped (i.e. ridged) to correspond to the shape of insertion member 72 or 92 of first speaker arm 70 or second speaker arm 90, respectively (See FIG. 8). Similarly, a second internal receiving area 56 can be provided and preferably begins at open outer end 52 and within a preferred majority of the internal length of right body portion 50 for receiving first speaker arm 70 or second speaker arm 90. Second internal receiving area 56 can also have a smooth or ridged internal wall, similar to first internal receiving area 36. The internal length of first internal receiving area 36 and second internal receiving area 56 is not limited to any specific length, and are preferably long enough to receive some or all of the length of speaker arm 70 or 90, to allow the position of the Speaker (defined below) to be adjusted or located at different positions with respect to the user's ear (See FIG. 1. FIG. 2. FIG. 3 and FIG. 4). It is also within the scope of the disclosure that the entire internal length of body 22 can have a passageway such that internal receiving area 36 and internal receiving area 56 are portions of the single internal passageway running from open outer end 32 to open outer end 52.

Preferably, the non-insertion ends 74 and 94 of speaker arms 70 and 90, respectively, are provided with speaker/pods/earbud, etc. (collectively "Speaker" or "Speaker 120") connectors which in one non-limiting preferred embodiment can be an opening 76 and 96, for which a portion of Speaker 120 (i.e. stem/post 122, etc.) is snugly inserted through and secured by the snug fit due to the diameter size of the stem/post 122 and the diameter size of openings 76 and 96 (See FIG. 6, FIG. 7 and FIG. 8).

Figure 8:
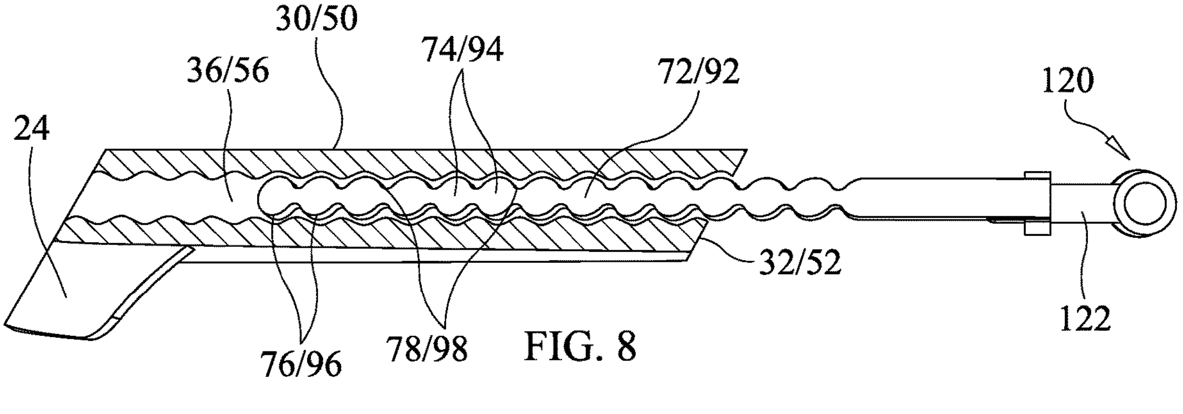
FIG. 8 is a sectional view of a one end of the body member of the novel securement assembly with a smooth internal wall and one speaker arm in accordance with the present disclosure.

As best seen in FIG. 8, the internal edge of the opening at outer open end 32 and outer open end 52 can be located in or near one of the valleys 78 or 98 for maintaining the position of arm 70 or 90, respectively, with respect to open end 32 or 52. Other conventional mechanisms for removably and adjustably securing arms 70 and 90 to left and right body portions 30 and 50 can be used and are also considered within the scope of the invention.

Figure 5:
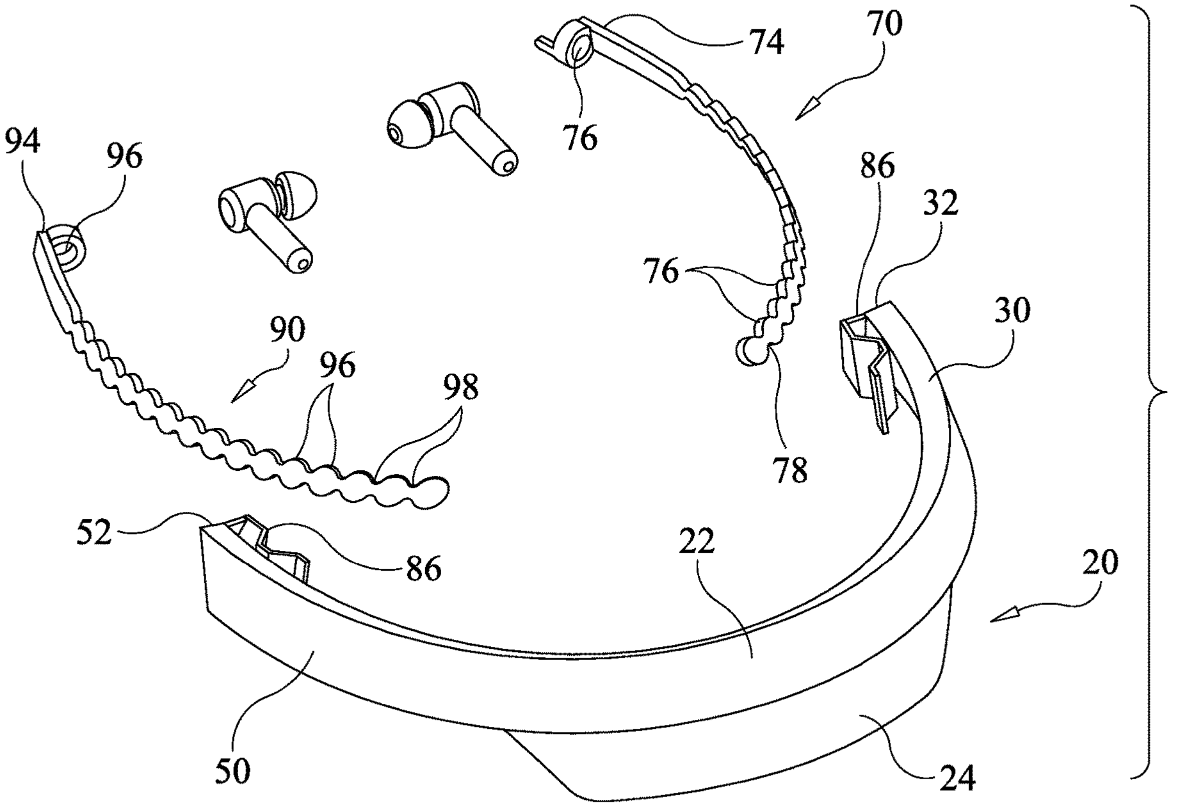
FIG. 5 is an exploded view of the novel securement assembly in accordance with the present disclosure and showing a pair of conventional Air Pods, ear buds, speakers, etc.
Figure 6:
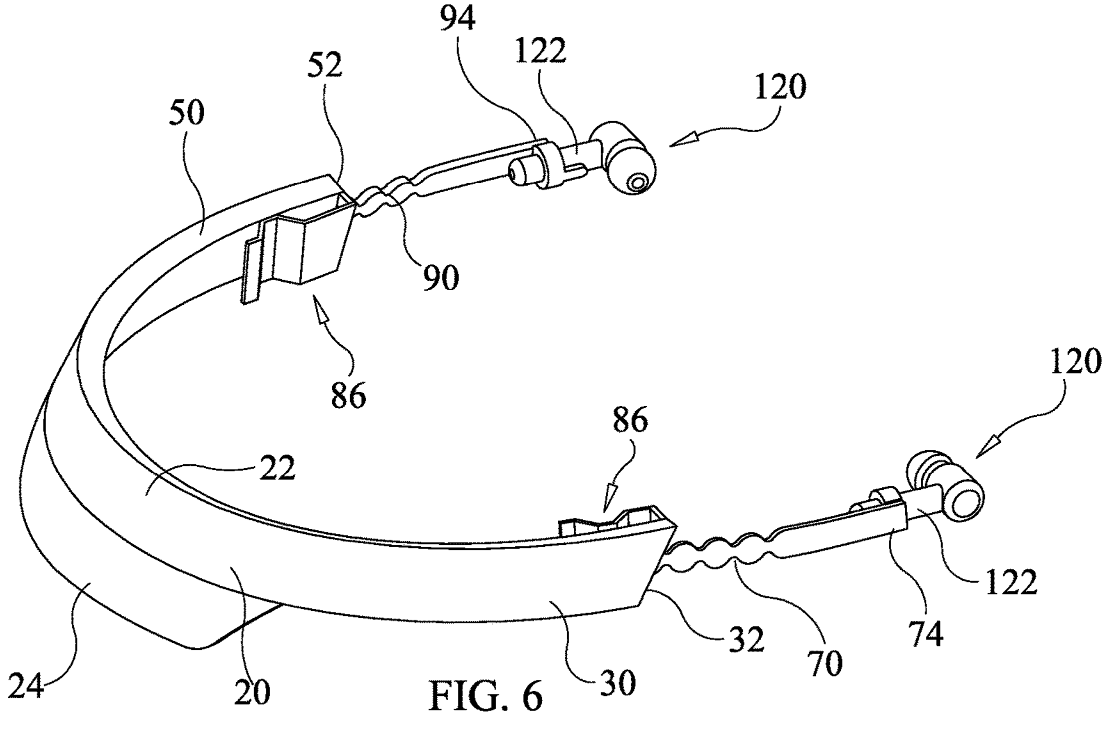
FIG. 6 is a perspective view of the novel securement assembly in accordance with the present disclosure.
Figure 7:
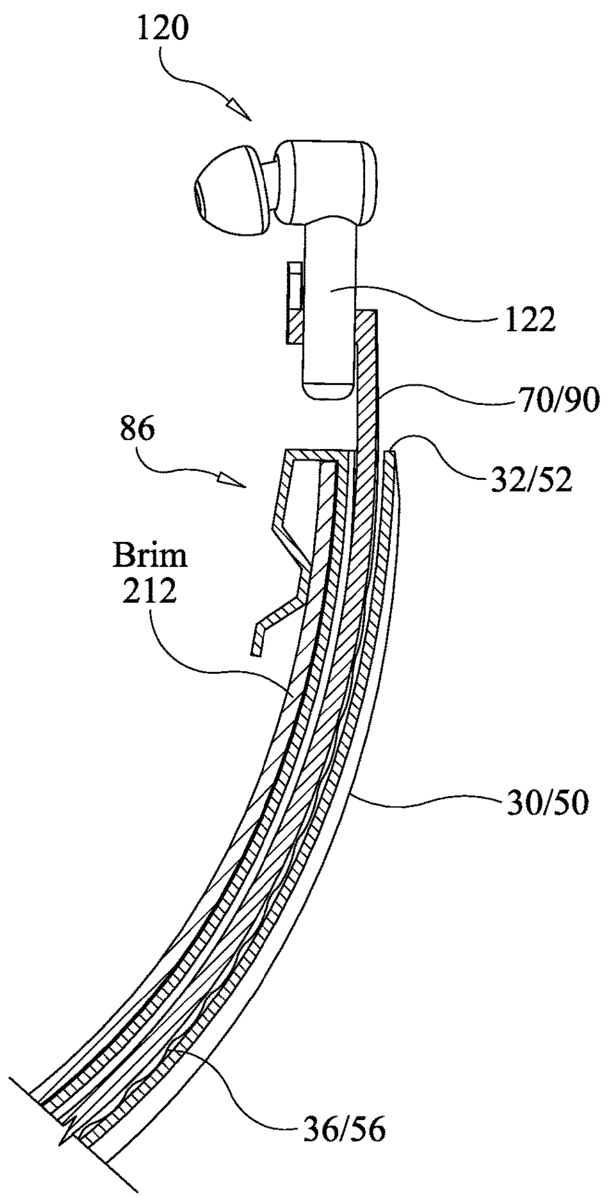
FIG. 7 is a sectional view of a one end of the body member of the novel securement assembly with a smooth internal wall and one speaker arm in accordance with the present disclosure.
Figure 9:
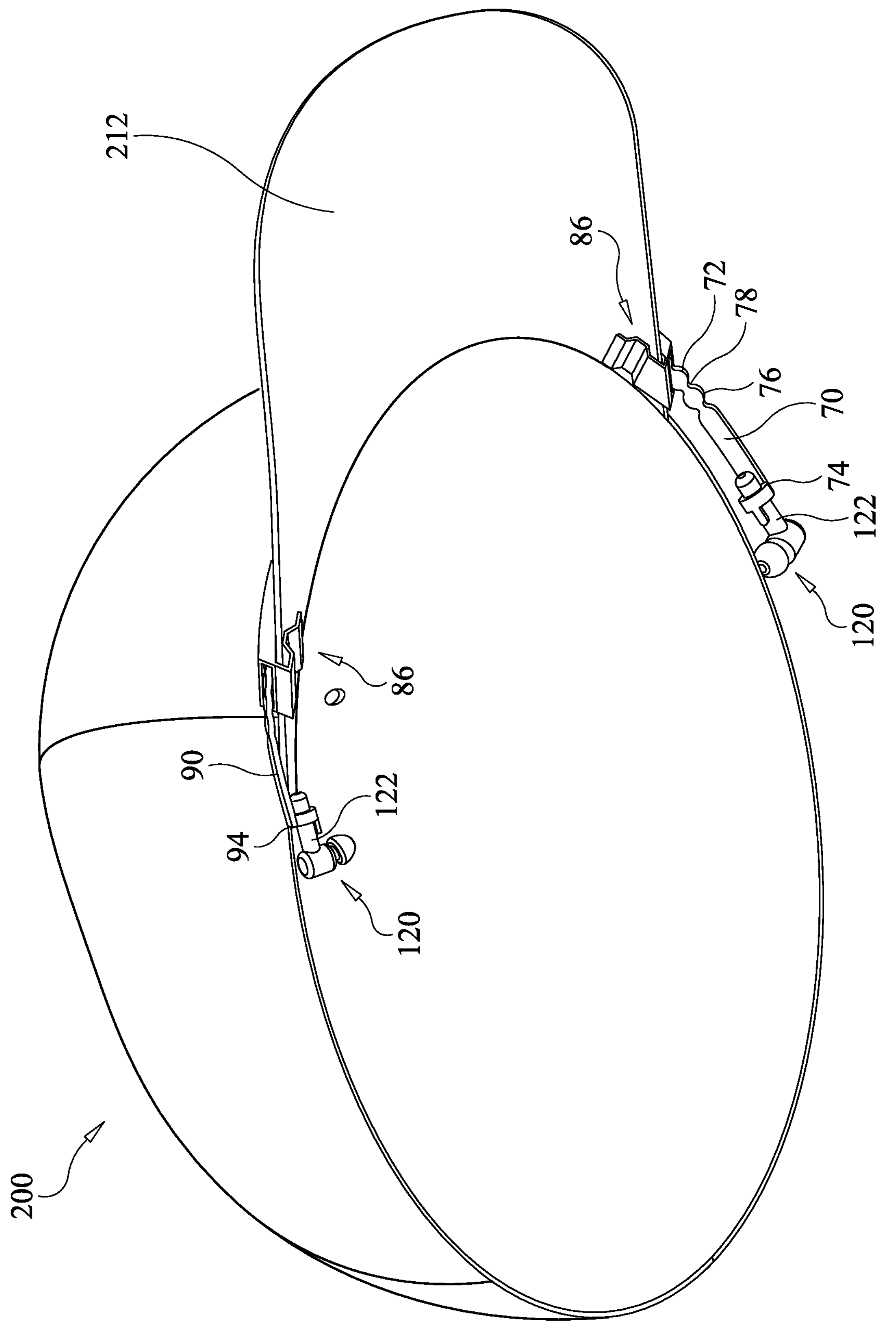
FIG. 9 is a perspective bottom view showing the novel securement assembly secure to a headwear in accordance with the present disclosure.

As best seen in use in FIG. 9 and also generally seen not in use in FIG. 5. FIG. 6 and FIG. 7, preferably a clasp, clip or clamp member 86 (or other conventional securement member) can be provided at or near open outer end 32 and open outer end 52 for removably securing body 20 to headwear 200, which in a preferred embodiment can be a hat or cap having a bill or brim 212. As seen in FIG. 9, preferably a portion of a side of bill or brim 212 is received by clasp/clamp member 86 on each side of bill or brim 212. Preferably clasp/clip/clamp members 86 can be monolithically formed or constructed integral with body member 20 (though such is not considered limiting) such that members 86 and body member 20 can preferably be a one-piece member.

A flange member 24 can extend downward (preferably at an angle) with respect to center body portion 22 and provides for a further contact point with headwear 200 (See FIG. 1, FIG. 2, FIG. 3 and FIG. 4).

Though preferably Speakers 120 can be wireless, speaker securement assembly 10 can also be used with wired Speakers.

Though not considered limiting, the speaker arms can be made from a flexible material such that positioned/adjusted by the user in non-linear position in addition to their linear movement from being pulled outward or pushed inward with respect to the body member. The body member can also be constructed from a flexible material. However, it is also considered to be within the scope of the disclosure that the body member and/or the speaker arm(s) are constructed from a rigid material.

The Clasp and other parts shown in the drawings are not considered limited to the specific embodiments shown in the drawings and other Clasps and parts (not shown in the drawings) can also be used for similar purposes and are also considered within the scope of the disclosure.

The disclosed and shown speaker securement assembly can include, without limitation, the following features, advantages, functions and/or benefits:

1. Removable and adjustable speaker arms 70 and 90, preferably constructed from a flexible material and with the material also allowing the speaker arms to retain their position (i.e. maintain a non-linear position they are moved to by the user/wearer on their own—have "memory"). The speaker arms that can slide in and out of body 20;
2. Body 20 provides for a flexible housing
3. Air pods/true wireless earbuds which can be molded to speaker arms 70 and 90;
4. Body 20 can be preferably provided with one or more clasping that removably attaches to the bill 212 of the cap/headwear 200;
5. Body 20 can be preferably flexible throughout to allow it to form to the shape of bill 212 of cap 200 preferably where bill 212 is joined to cap 200;

6. Body 20 can be attached above bill 212 and/or underneath bill 212 using clasps/clamps 86;
7. Body 20 preferably provides and/or defines an internal guide which speaker arms 70 and 90 slide in and out of;
8. Speaker arms 70 and 90 can be grooved for adjustment and locking in for use.
9. For certain uses body 20 can be provided with a solar panel, small LED light and/or other electronic device, preferably located at or one center body portion 22 or center of the bill/brim 212, though such location is not considered limiting;
10. Securement assembly 10 can be preferably constructed from 3 molded parts (i.e. body 20, left speaker arm 70 and right speaker arm 90 (though such is not considered limiting).
11. Body 20 can be molded in 3 parts (i.e. center body 22, left body 30 and right body 50), with the body portions preferably constructed integral or monolithically formed into a one-piece member (though such configuration is not considered limiting).
12. Center body 22 can be used for securing or housing any required electronics, while left and right body portions 30 and 50, respectfully can be used for any wires (if any), speaker arms 70 and 90 and speakers/earbuds 120.
13. Body 20 and/or speaker arms 70 and 90 can be constructed from silicon, rubber, nylon, cloth, polyester, or any other material or combination of materials that preferably allows body 20 to be flexible and fit to the bill/brim 212 of a cap/headwear 200.
14. Where body 20 is not one piece, but rather separate center portion 22, left portion 30 and right portion 50, center portion 22 can be provided with a clasp/clamp to allow center body 22 to connect similar to the connection of a FITBIT wrist watch, which technology is incorporated by reference as if fully set forth herein, (i.e. the center body can be attached with a molded male and female connection/snap in connections to the left and right side portions). In this embodiment, preferably center body 22 can hold the electronics and the left and right body housing 30 and 50 can house the adjustable speaker arms and/or wires that can connect to the ear buds/Speakers 120.
15. Speaker arms 70 and 90 can be flexible to allow the airpods/earbuds/Speakers to fit in the ears as traditionally worn, or to rest above the ear behind the ear and/or to be placed just at or near the ear chamber (i.e. near/adjacent to the cymba conche section of the ear).
16. When not in use, speaker arms 70 and 90 can be pushed within left and right body portions 30 and 50, to safely stow speaker arms 70 and 90 into body 20 quickly and easily speaker arms 70 and 90 back into the body 20.
17. Preferably the interior/internal walls of the receiving areas are smooth. The sides of the speaker arms 70 and 90 can be ridged (i.e. similar to a zip tie whose structure is incorporated by references as if fully set forth herein), but can also be smooth. A stop member can be provided at open outer end 32 and open outer end 52 for maintaining the desired position of the speaker arms 70 and 90 with respect to body 20. In one non-limiting embodiment, one or more arrowhead shapes can be provided for speaker arm 70 and/or 90, such that when the speaker arm 70 and/or 90 is moved the arrowhead contacts a ledge member for outer open end 32 and/or outer open end 52 to prevent speaker arms 70 and/or 90 from falling out.

The Speakers can be in electrical wireless or wired communication with an electronic device (i.e. smart phone, tablet, computer, etc.) as conventionally known using any known or later developed communication technology to transfer or transmit sound, music, audio, etc. to the Speakers.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the Figures, it will be understood by those of ordinary skill in the art that various changes in form and details may be made therein without departing from their spirit and scope.

All components of the described securement assembly and their locations, mechanical communication/connection methods between components, headwear types, electronic device types, speaker types, speaker position/location with respect to the user's ear, materials, dimensions, etc. discussed above or shown in the drawings, if any, are merely by way of example and are not considered limiting and other component(s) and their locations, mechanical communication/connection methods between components, headwear types, electronic device types, speaker types, speaker position/location with respect to the user's ear, materials, dimensions, etc. can be chosen and used and all are considered within the scope of the disclosure.

Dimensions of certain parts as shown in the drawings may have been modified and/or exaggerated for the purpose of clarity of illustration and are not considered limiting.

While the speaker securement assembly has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A speaker securement assembly adapted for removable securement to a headwear, comprising:

a body member;

a first arm adjustably secured to the body member, the first arm having a first end disposed within the body member and a second end, the second end of the first arm having a first Speaker connector; and a second arm adjustably secured to the body member, the second arm having a first end disposed within the body member and a second end, the second end of the second arm having a second Speaker connector;

wherein the body member adapted for removable securement to a headwear being worn by an individual such that a first Speaker attached to the second end of the first arm by the first Speaker connector is positioned at or nearby to a first ear of the individual and a second Speaker attached to the second end of the second arm by the second Speaker connector is positioned at or nearby to a second ear of the individual;

wherein the first Speaker connector having a first opening adapted for snugly receiving a post portion of a first Speaker and the second Speaker connector having a second opening adapted for snugly receiving a post portion of a second Speaker.

2. The speaker securement assembly of claim 1 wherein the body member having a left portion, a center portion and a right portion; wherein the first end of the first arm is adjustably received within the left portion and the first end of the second arm is adjustably receiving within the right portion.

3. The speaker securement assembly of claim 1 further comprising a first Clasp secured to the body member to provide a first removable securement position of the body member to the headwear and a second Clasp secured to the body member to provide a second removable securement position of the body member to the headwear.

4. The speaker securement assembly of claim 2 further comprising a first Clasp secured to the left portion to provide a first removable securement position of the body member to the headwear and a second Clasp secured to the right portion to provide a second removable securement position of the body member to the headwear.

5. The speaker securement assembly of claim 1 wherein the first end of the first speaker arm having a plurality of ridges for mating within a first correspondingly shaped area of the body member and the first end of the second speaker arm having a plurality of ridges for mating within a second correspondingly shaped area of the body member.

6. The speaker securement assembly of claim 2 wherein the first end of the first speaker arm having a plurality of ridges for mating within a first correspondingly shaped area of the left portion and the first end of the second speaker arm having a plurality of ridges for mating within a second correspondingly shaped area of the right portion.

7. A speaker securement assembly adapted for removable securement to a headwear, comprising:

a body member;

a first arm adjustably secured to the body member, the first arm having a first end disposed within the body member and a second end, the second end of the first arm having a first Speaker connector; and a second arm adjustably secured to the body member, the second arm having a first end disposed within the body member and a second end, the second end of the second arm having a second Speaker connector;

wherein the body member adapted for removable securement to a headwear being worn by an individual such that a first Speaker attached to the second end of the first arm by the first Speaker connector is positioned at or nearby to a first ear of the individual and a second Speaker attached to the second end of the second arm by the second Speaker connector is positioned at or nearby to a second ear of the individual;

wherein the body member further having a flange portion extending outward and downward from the center portion; wherein when the body member is removably secured to the headwear the flange portion contacts a brim portion of the headwear.

8. The speaker securement assembly of claim 3 wherein the first Clasp is secured to a first area of a brim portion of the headwear and the second Clasp is secured to a second area of the brim portion of the headwear when the body member is removably secured to the headwear.

9. The speaker securement assembly of claim 4 wherein the first Clasp is secured to a first area of a brim portion of the headwear and the second Clasp is secured to a second area of the brim portion of the headwear when the body member is removably secured to the headwear.

10. A speaker securement assembly adapted for removable securement to a headwear, comprising:

a body member;

a first arm adjustably secured to the body member, the first arm having a first end disposed within the body member and a second end, the second end of the first arm having a first Speaker connector;

a second arm adjustably secured to the body member, the second arm having a first end disposed within the body member and a second end, the second end of the second arm having a second Speaker connector;

a first Clasp secured to the body member to provide a first removable securement position of the body member to the headwear; and a second Clasp secured to the body member to provide a second removable securement position of the body member to the headwear;

wherein the body member adapted for removable securement to a headwear being worn by an individual such that a first Speaker attached to the second end of the first arm by the first Speaker connector is positioned at or nearby to a first ear of the individual and a second Speaker attached to the second end of the second arm by the second Speaker connector is positioned at or nearby to a second ear of the individual;

wherein the first Speaker connector having a first opening adapted for snugly receiving a post portion of a first Speaker and the second Speaker connector having a second opening adapted for snugly receiving a post portion of a second Speaker.

11. The speaker securement assembly of claim 10 wherein the first end of the first speaker arm having a plurality of ridges for mating within a first correspondingly shaped area of the body member and the first end of the second speaker arm having a plurality of ridges for mating within a second correspondingly shaped area of the body member.

12. A speaker securement assembly adapted for removable securement to a headwear, comprising:

a body member;

a first arm adjustably secured to the body member, the first arm having a first end disposed within the body member and a second end, the second end of the first arm having a first Speaker connector;

a second arm adjustably secured to the body member, the second arm having a first end disposed within the body member and a second end, the second end of the second arm having a second Speaker connector;

a first Clasp secured to the body member to provide a first removable securement position of the body member to the headwear; and a second Clasp secured to the body member to provide a second removable securement position of the body member to the headwear;

wherein the body member adapted for removable securement to a headwear being worn by an individual such that a first Speaker attached to the second end of the first arm by the first Speaker connector is positioned at or nearby to a first ear of the individual and a second Speaker attached to the second end of the second arm by the second Speaker connector is positioned at or nearby to a second ear of the individual;

wherein the first Clasp is secured to a first area of a brim portion of the headwear and the second Clasp is secured to a second area of the brim portion of the headwear when the body member is removably secured to the headwear.

13. A speaker securement assembly adapted for removable securement to a headwear, comprising:

a body member, the body member having a left portion, a center portion and a right portion;

a first arm adjustably received by the left portion of the body member, the first arm having a first end disposed within the left portion and a second end, the second end of the first arm having a first Speaker connector;

a second arm adjustably received by the right portion of the body member, the second arm having a first end disposed within the right portion and a second end, the second end of the second arm having a second Speaker connector;

a first Clasp secured to the left portion to provide a first removable securement position of the body member to the headwear; and a second Clasp secured to the right portion to provide a second removable securement position of the body member to the headwear;

wherein the body member adapted for removable securement to a headwear being worn by an individual such that a first Speaker attached to the second end of the first arm by the first Speaker connector is positioned at or nearby to a first ear of the individual and a second Speaker attached to the second end of the second arm by the second Speaker connector is positioned at or nearby to a second ear of the individual;

wherein the first Speaker connector having a first opening adapted for snugly receiving a post portion of a first Speaker and the second Speaker connector having a second opening adapted for snugly receiving a post portion of a second Speaker.

14. The speaker securement assembly of claim 13 wherein the first end of the first speaker arm having a plurality of ridges for mating within a first correspondingly shaped area of the left portion and the first end of the second speaker arm having a plurality of ridges for mating within a second correspondingly shaped area of the right portion.

15. A speaker securement assembly adapted for removable securement to a headwear, comprising:

a body member, the body member having a left portion, a center portion and a right portion;

a first arm adjustably received by the left portion of the body member, the first arm having a first end disposed within the left portion and a second end, the second end of the first arm having a first Speaker connector;

a second arm adjustably received by the right portion of the body member, the second arm having a first end disposed within the right portion and a second end, the second end of the second arm having a second Speaker connector;

a first Clasp secured to the left portion to provide a first removable securement position of the body member to the headwear; and a second Clasp secured to the right portion to provide a second removable securement position of the body member to the headwear;

wherein the body member adapted for removable securement to a headwear being worn by an individual such that a first Speaker attached to the second end of the first arm by the first Speaker connector is positioned at or nearby to a first ear of the individual and a second Speaker attached to the second end of the second arm by the second Speaker connector is positioned at or nearby to a second ear of the individual;

wherein the body member further having a flange portion extending outward and downward from the center portion; wherein when the body member is removably secured to the headwear the flange portion contacts a brim portion of the headwear.

16. The speaker securement assembly of claim 13 wherein the first Clasp is secured to a first area of a brim portion of the headwear and the second Clasp is secured to a second area of the brim portion of the headwear when the body member is removably secured to the headwear.

* * * * *